US007668980B2

(12) United States Patent
Hathorn et al.

(10) Patent No.: US 7,668,980 B2
(45) Date of Patent: Feb. 23, 2010

(54) USAGE OF PERSISTENT INFORMATION UNIT PACING PROTOCOL IN FIBRE CHANNEL COMMUNICATIONS

(75) Inventors: Roger Gregory Hathorn, Tucson, AZ (US); Bret Wayne Holley, Tucson, AZ (US); Matthew Joseph Kalos, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 11/948,833

(22) Filed: Nov. 30, 2007

(65) Prior Publication Data
US 2009/0144464 A1 Jun. 4, 2009

(51) Int. Cl.
*G06F 13/00* (2006.01)
(52) U.S. Cl. ............... 710/34; 710/29; 710/33; 709/211; 709/212; 709/225; 709/231; 709/237
(58) Field of Classification Search ........... 710/29, 710/33, 34; 709/211, 212, 225, 231, 237
See application file for complete search history.

(56) References Cited

U.S. PATENT DOCUMENTS

| 4,170,038 | A  | 10/1979 | Bouvier et al. |
| 6,920,537 | B2 | 7/2005  | Ofek et al. |
| 7,500,030 | B2 | 3/2009  | Hathorn et al. |
| 2001/0027486 | A1 | 10/2001 | Takamoto et al. |
| 2003/0088638 | A1 | 5/2003  | Gluck et al. |
| 2006/0004765 | A1 | 1/2006  | Anderson et al. |
| 2008/0059638 | A1 | 3/2008  | Hathorn et al. |

OTHER PUBLICATIONS

Lin, et al., "Performance of High-Speed Network I/O Subsystems: Case Study of a Fibre Channel Network", IEEE, 1994, pp. 174-183.
"Fibre Channel Single-Byte Command Code Sets-3 Mapping Protocol", Rev. 1.6, American National Standard for Information Technology, Mar. 26, 2003, pp. 1-206.
"Fibre Channel Single-Byte Command Code Sets Amendment 1", Rev. 1.03, American National Standard for Information Technology, Feb. 7, 2007, pp. 1-23.

*Primary Examiner*—Alford W Kindred
*Assistant Examiner*—Chun-Kuan Lee
(74) *Attorney, Agent, or Firm*—Rabindranath Dutta; Konrad Raynes & Victor LLP

(57) ABSTRACT

Provided are a method, system, and article of manufacture, wherein a primary storage control unit receives an information unit from a remote host over a fiber channel connection, wherein persistent information unit pacing is implemented over the fiber channel connection. Information is maintained on how many large writes have been received at the primary storage control unit over at least one logical path established over the fiber channel connection between the primary storage control unit and the remote host, wherein a large write is an input/output (I/O) operation for which a number of data information units that are processed exceeds a default value of an information unit pacing credit. The primary storage control unit adjusts an information unit pacing parameter included in a response sent from the primary storage control unit to the remote host, wherein the adjusting is based at least on the information maintained on how many large writes have been received at the primary storage control unit over the at least one logical path.

20 Claims, 9 Drawing Sheets

USAGE OF PERSISTENT INFORMATION UNIT PACING PROTOCOL IN FIBRE CHANNEL COMMUNICATIONS

BACKGROUND

1. Field

The disclosure relates to a method, system, and article of manufacture for the usage of persistent information unit pacing protocol in fibre channel communications.

2. Background

Fibre Channel refers to an integrated set of architectural standards for data transfer developed by the American National Standards Institute. Fibre Connection (FICON) is a protocol of the fibre channel architecture and may also be referred to by the formal name of FC-SB-3. Further details of FC-SB-3 may be found in the publication, "FIBRE CHANNEL Single-Byte Command Code Sets-3 Mapping Protocol (FC-SB-3)", Rev. 1.6, published by the American National Standards for Information Technology on Mar. 26, 2003 and in the publication, "Fibre Channel Single-Byte Command Code Sets-3", AMENDMENT 1 (FC-SB-3/AM1), INCITS 374-2003/AM1-2007, published by the American National Standard for Information Technology on 28 Sep., 2007.

A channel is a direct or a switched point-to-point connection between communicating devices. In the Fibre Channel architecture, a FICON channel may perform the functions specified by FC-SB-3 to provide access to Input/Output (I/O) devices by means of control units or emulated control units. FICON channels may rely on packet switching for transferring data between communicating devices.

A channel command word (CCW) is a control block which includes an I/O request, and may refer to a structure of a specific system architecture which specifies a command to be executed along with parameters. A channel program is a sequence of one or more channel command words executed sequentially that controls a specific sequence of channel operations. FICON channels may transmit up to sixteen channel command words at a time along with the associated data for any write operations, where a channel command word may be referred to as an "information unit" (IU). If more than sixteen information units are present in a channel program then after the transmission of the first sixteen information units the remaining information units may be transmitted in groups of eight until the channel program is completed. The additional information units beyond sixteen can only be sent after having received a Command Response from the recipient in response to a Command Response Request (CRR). It should be noted that although it is common practice for the transmission of the remaining information units to be made in groups of eight, the transmission of the remaining information units need not necessarily be in groups of eight.

Extended Remote Copy (XRC) also referred to as Global Mirror Z (GMz or zGM) is a copy function available for the z/OS* and OS/390* operating systems. XRC maintains a copy of the data asynchronously at a remote location, and can be implemented over extended distances, such as distances of over one hundred kilometers. XRC may be used in IBM Enterprise Storage Servers* (ESS). Further details of XRC may be found in the publication "IBM TotalStorage Enterprise Storage Server: Implementing ESS Copy Services with IBM eServer zSeries," published by International Business Machines Corporation, in July, 2004.

\* z/OS, OS/390, and Enterprise Storage server are trademarks or registered trademarks of International Business Machines Corporation.

Extended Distance XRC configurations may use fiber channel extension technologies between a remote host and a primary site control unit. This extended Fibre Channel may be used by the remote host to read data from the primary site control unit and store the backup data on storage at a remote site. The remote host may issue command chains to the primary site control unit containing a define subsystem operation (DSO) command followed by a series of read record set (RRS) commands, and finally a Perform Subsystem Function (PSF)/Read SubSystem Data (RSSD) command set to determine the number of side-file entries for the next chain. The count of RRS commands in the chain may be indicated in the DSO command parameters. This count in certain solutions may be about 150 CCWs.

A flow control method referred to as "information unit pacing" in the FICON architecture, may restrict a FICON channel to have at most sixteen information units in flight at any point in time. A channel program may request a command response information unit by setting the command response request (CRR) bit in the eighth information unit. When the channel program receives the command response information unit from the control unit, another 8 information units are sent. This may cause data rate droop at extended distances, such as distances beyond a hundred kilometers, because the control unit must receive the first group of 16 information units before requesting additional units according to the FICON pacing protocol, thus adding additional round trips of communication between the channel and control unit ports. The number of round trips depends on the size of a channel command word chain. If there are 150 channel command words in a channel command word chain, then there may be up to 17 round trips. At extended distances, such as distances beyond a hundred kilometers, a significant overhead may be added for the additional round trips of communication.

For this reason, so called "spoofing" channel extenders have added functionality to examine each command to see the command is a DSO/RRS command chain. If so, the remote channel extender may generate a CCW chain of RRS commands to simulate commands that are expected to be received by the local extender. The data is shipped by the remote extender to the local extender where the CCW chain is then executed on the data received as if it were in the control unit. This avoids data rate droop caused by extra round trips required of long distance. However, this functionality in the channel extenders may limit customers to relatively expensive solutions for channel extension.

SUMMARY OF THE DESCRIBED EMBODIMENTS

Provided are a method, system, and article of manufacture, wherein a primary storage control unit receives an information unit from a remote host over a fibre channel connection, wherein persistent information unit pacing is implemented over the fibre channel connection. Information is maintained on how many large writes have been received at the primary storage control unit over at least one logical path established over the fibre channel connection between the primary storage control unit and the remote host, wherein a large write is an input/output (I/O) operation for which a number of data information units that are processed exceeds a default value of an information unit pacing credit. The primary storage control unit adjusts an information unit pacing parameter included in a response sent from the primary storage control unit to the remote host, wherein the adjusting is based at least on the information maintained on how many large writes have been received at the primary storage control unit over the at least one logical path.

In certain embodiments, the information unit pacing parameter indicates the number of information units that the remote host is allowed to send to the primary storage control unit without waiting for any additional response from the primary storage control unit, and wherein the information unit pacing parameter for the at least one logical path is set to a number that is greater than sixteen but fewer than two hundred and fifty six if there is no congestion of write buffers caused by the large writes.

In further embodiments, the information unit is a channel command word in a fibre connect protocol, and wherein the received channel command word starts a channel command word chain. A determination is made as to whether the channel command word comprises a define subsystem operation command that defines a subsystem operation for extended remote copy operations. The number of read record set commands associated with the define subsystem operation command is determined, wherein a read record set command corresponds to a read request. The information unit pacing parameter value for a logical path is set such that an increased number of information units can be sent at a start of a next channel program, wherein if a same or a smaller number of the read record set commands are used, an entire chain can be sent at once.

In yet further embodiments, if a plurality of large writes causes congestion of write buffers then the information unit pacing parameter is reset for all logical paths in which large writes exceed a predetermined threshold.

In certain embodiments, the remote host performs extended remote copying of data from the primary storage control unit to a remote storage control unit, wherein the remote host is geographically separated from the primary storage control unit by a distance of over a hundred kilometers.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Overview of Certain Exemplary Embodiments

The persistent IU pacing protocol allows the channel to send more than 16 information units at a time to the control unit, thus alleviating command related data rate droop at extended distances. Certain embodiments that use the persistent IU pacing protocol allow a primary storage control unit in an extended distance remote copy (XRC) environment to modify the flow of information units within the FICON architecture, such that more than sixteen information units can be in flight at certain points in time. In extended distance remote copy implementations using FICON in a fibre channel network, a remote host may perform extended distance remote copy operations to copy data from a primary storage control unit to a remote storage control unit. By allowing more than sixteen information units to be in flight at certain points in time, certain embodiments may reduce the time for performing extended remote copy in comparison to situations where a channel is restricted to have no more than sixteen information units in flight at any point in time.

Certain embodiments implement congestion control of write operations that may interfere with reads in XRC implementations over the FICON architecture by performing the following operations:

(i) A LW (Large Write) count tracks large writes for each logical path. A large write is defined as an I/O operation for which a number of data IUs that are processed exceeds the default IU pacing credit.

(ii) Each time a DSO with RRS suborder is received on a logical path, the LW count is decremented. If the LW count reaches 0 at this time, the pacing credit for the logical path is set to three more than the number of RRS commands indicated in the DSO command parameter, subject to the maximum pacing credit being 255.

(iii) At the end of a chain, the LW count is incremented if the write IU count for that chain exceeds the default pacing credit (or an adjustable value). If the LW count reaches a maximum value, that logical path is placed on a Large Write Threshold (LWT) list. To account for extremely large LW chains, the LW count may be incremented by the LW count for that chain divided by the default pacing count.

(iv) At the end of an I/O operation, if write buffer congestion has occurred, then the pacing count is reset for all logical paths on the LWT list.

(v) The LW count is not permitted to decrement below 0 or increment above the chosen maximum.

(vi) At the start of a chain, the currently stored pacing credit for the logical path is used in the command response (CMR) and will take effect on the next chain started by the channel after receiving this CMR.

Exemplary Preferred Embodiments

Figure 1:
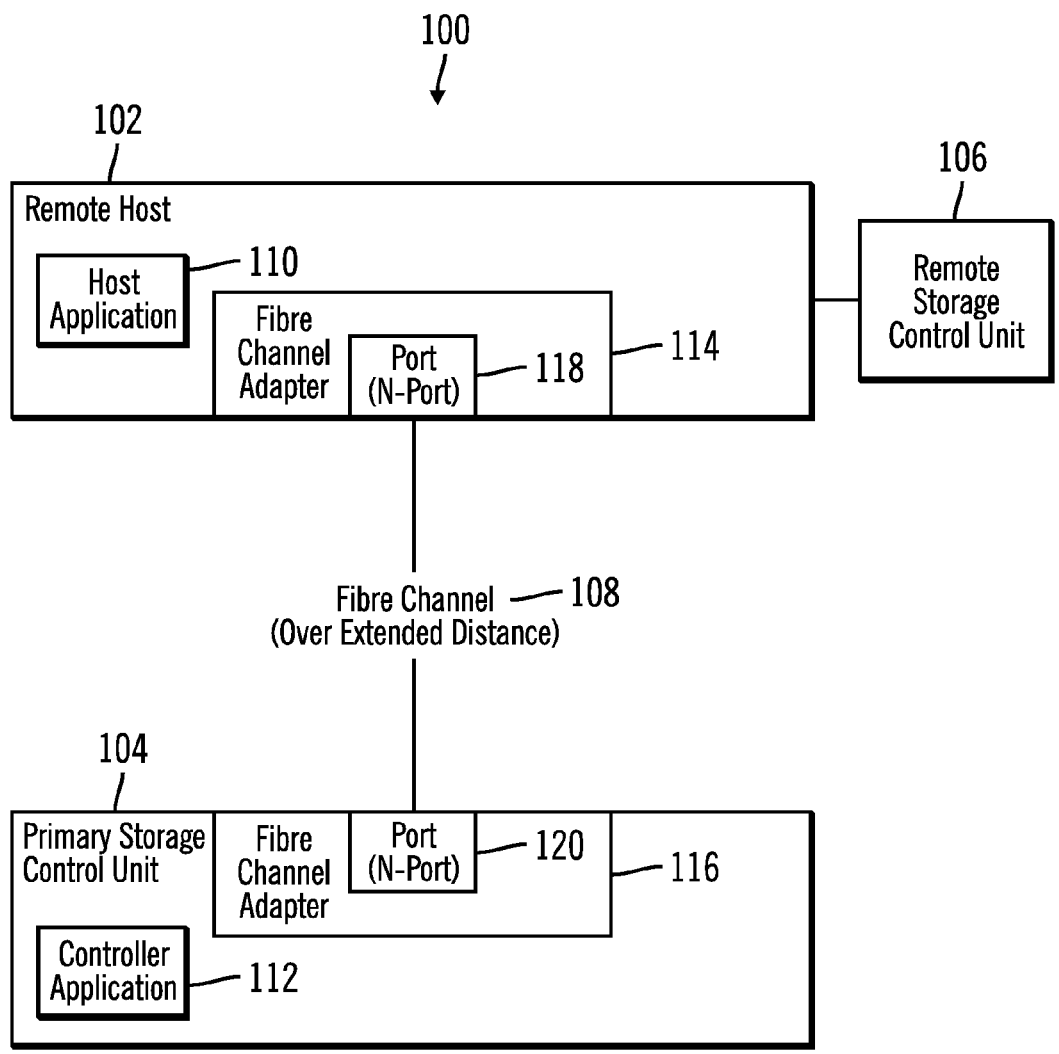
FIG. 1 illustrates a block diagram of a computing environment in accordance with certain embodiments.

FIG. 1 illustrates a block diagram of a computing environment 100 utilizing a remote host 102 coupled to a primary storage control unit 104 and a remote storage control unit 106. While FIG. 1 shows only a single remote host 102, a single primary storage control unit 104, and a single remote storage control unit 106, in certain alternative embodiments a plurality of remote hosts may be coupled to a plurality of primary and remote storage control units.

The remote host 102 may connect to the primary storage control unit 104 through a data interface channel, such as fibre channel 108 or any other data interface mechanism known in the art. The remote host 102 may be any suitable computational device presently known in the art, such as a personal computer, a workstation, a server, a mainframe, a hand held computer, a telephony device, a network appliance, etc. The remote host 102 may include any operating system known in the art, such as, the IBM OS/390 or the z/OS operating system.

The primary storage control unit 104 and the remote storage control unit 106 may include a plurality of logical volumes. The primary storage control unit 104 and the remote storage control unit 106 may control a plurality of physical storage devices, each of which may include one or more physical volumes.

The remote host 102 may include a host application 110 and the primary storage control unit 104 may include a controller application 112. The host application 110 interfaces with the controller application 112 to read data from the primary storage control unit 104 and store the data in the remote storage control unit 106. The host application 110 and the controller application 112 communicate over the fiber channel 108. In certain embodiments the host application 110 uses extended remote copy over the fiber channel 108 to copy data from the primary storage control unit 104 to the remote storage control unit 106.

Communications over the fibre channel 108 between the remote host 102 and the primary storage control unit 104 may be enabled by a fibre channel adapter 114 included in the remote host 102 and a fibre channel adapter 116 included in the primary storage control unit 104. The fibre channel adapter 114 included in the remote host 102 includes a port 118, and the fibre channel adapter 116 included in the primary storage control unit 104 includes a port 120, where the ports 118 and 120 may be referred to as N-ports in fibre channel terminology. Fibre channel based communications via the FICON protocol may be performed between the port 118 of the remote host 102 and the port 120 of the primary storage control unit 104. A plurality of logical paths may be established between the two fibre channel adapters 114, 116.

Therefore, FIG. 1, illustrates a computing environment 100 in which the host application 110 copies data from the primary storage control unit 104 to the remote storage control unit 106 via the FICON protocol by using extended remote copy operations. In certain embodiments the distance between the remote host 102 and the primary storage control unit 104 may exceed maximum distances supported by fibre channel architecture by using fibre channel extension solutions.

Figure 2:
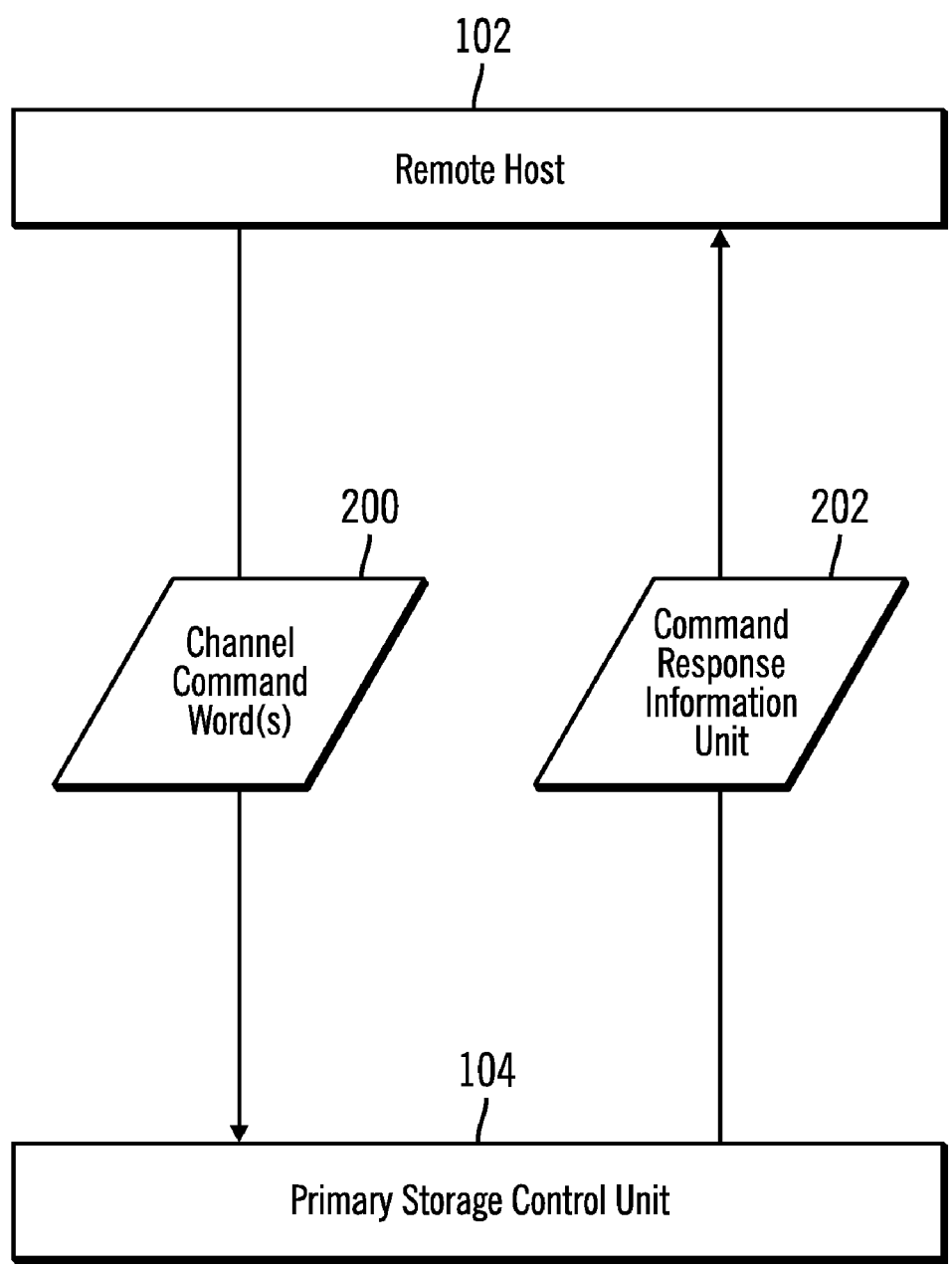
FIG. 2 illustrates a block diagram that shows communications between a remote host and a primary storage controller, in accordance with certain embodiments.

FIG. 2 illustrates a block diagram that shows communications between the remote host 102 and the primary storage controller 104, in accordance with certain embodiments implemented in the computing environment 100.

The remote host 102 is capable of sending one or more channel command words 200 in a sequence over a channel generated in accordance with the FICON protocol between the remote host 102 and the primary storage control unit 104. The primary storage control unit 104 may send a command response information unit 202 in response to certain channel command words 200. In certain embodiments by adjusting an IU pacing parameter, such as the IU pacing parameter, included in the command response information unit 202, the primary storage control unit 104 may modify the number of channel command words that may be in flight between the remote host 102 and the primary storage control unit 104.

Figure 3:
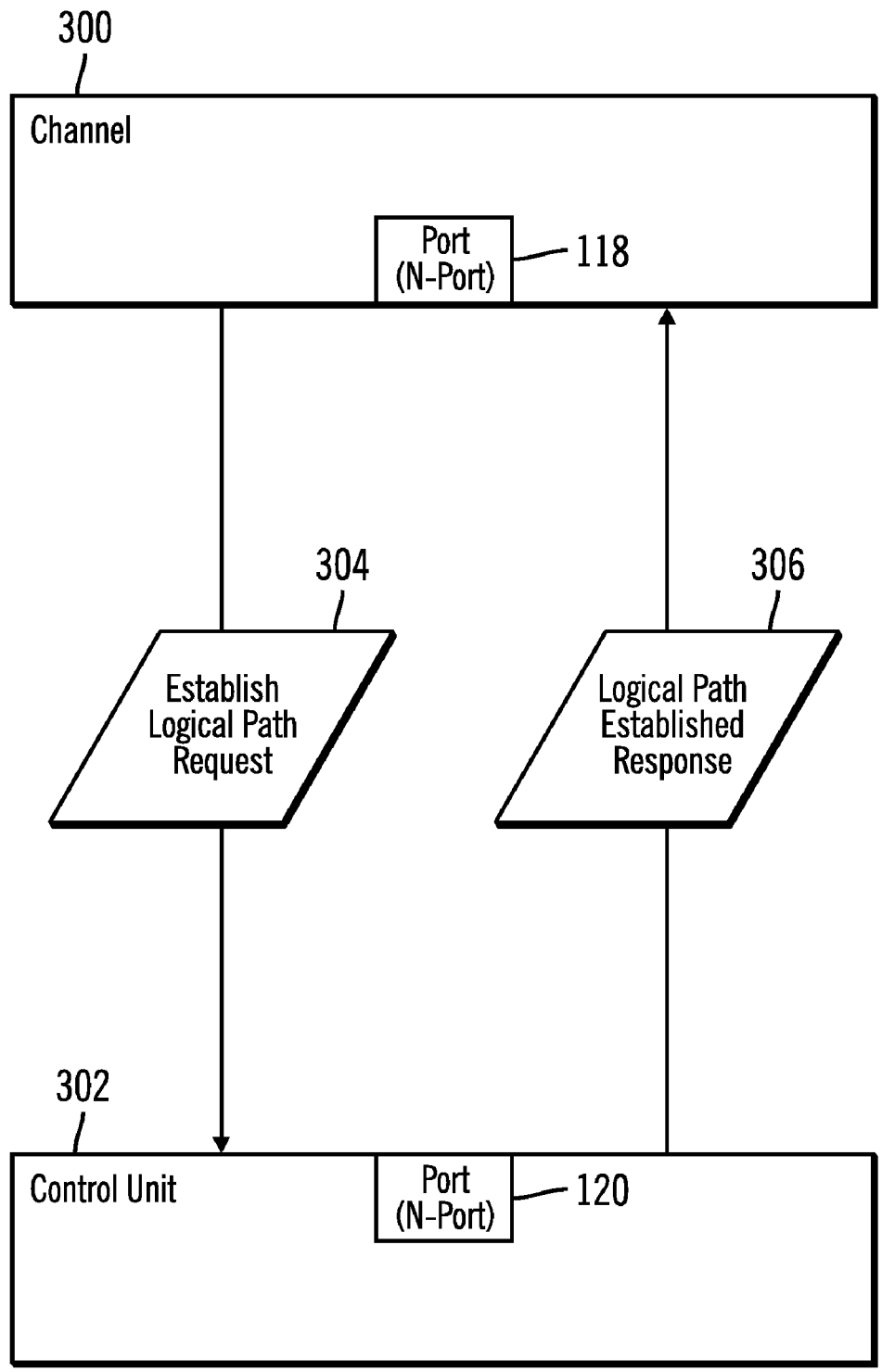
FIG. 3 illustrates a block diagram that shows communications between a channel and a control unit, in accordance with certain embodiments.

FIG. 3 illustrates a block diagram that shows communications between a channel 300 and a control unit 302 implemented in the computing environment 100, in accordance with certain embodiments.

In certain embodiments, the channel 300 is an entity of the remote host 102, and includes the port 118. The control unit 302 is an entity of the storage controller 104 and includes the port 120. A logical path may be established between the channel 300 and the control unit 302.

In certain embodiments, the channel sends an establish logical path (ELP) request 304 to the control unit 302 requesting the establishment of a logical path between in the channel 300 and the control unit 302. In response to receiving the establish logical path request 304, the control unit 302 may send a logical path established (LPE) response 306 to the channel 300 and establish the logical path.

In certain embodiments in which persistent IU pacing is implemented in accordance with the FICON architecture, the channel 300 may retain the value of the IU pacing parameter for a subsequent command chain if the control unit 302 indicated support for the retention of the value of the IU pacing parameter when the logical path was established by using the establish logical path request 304 and the logical path established response 306.

Figure 4:
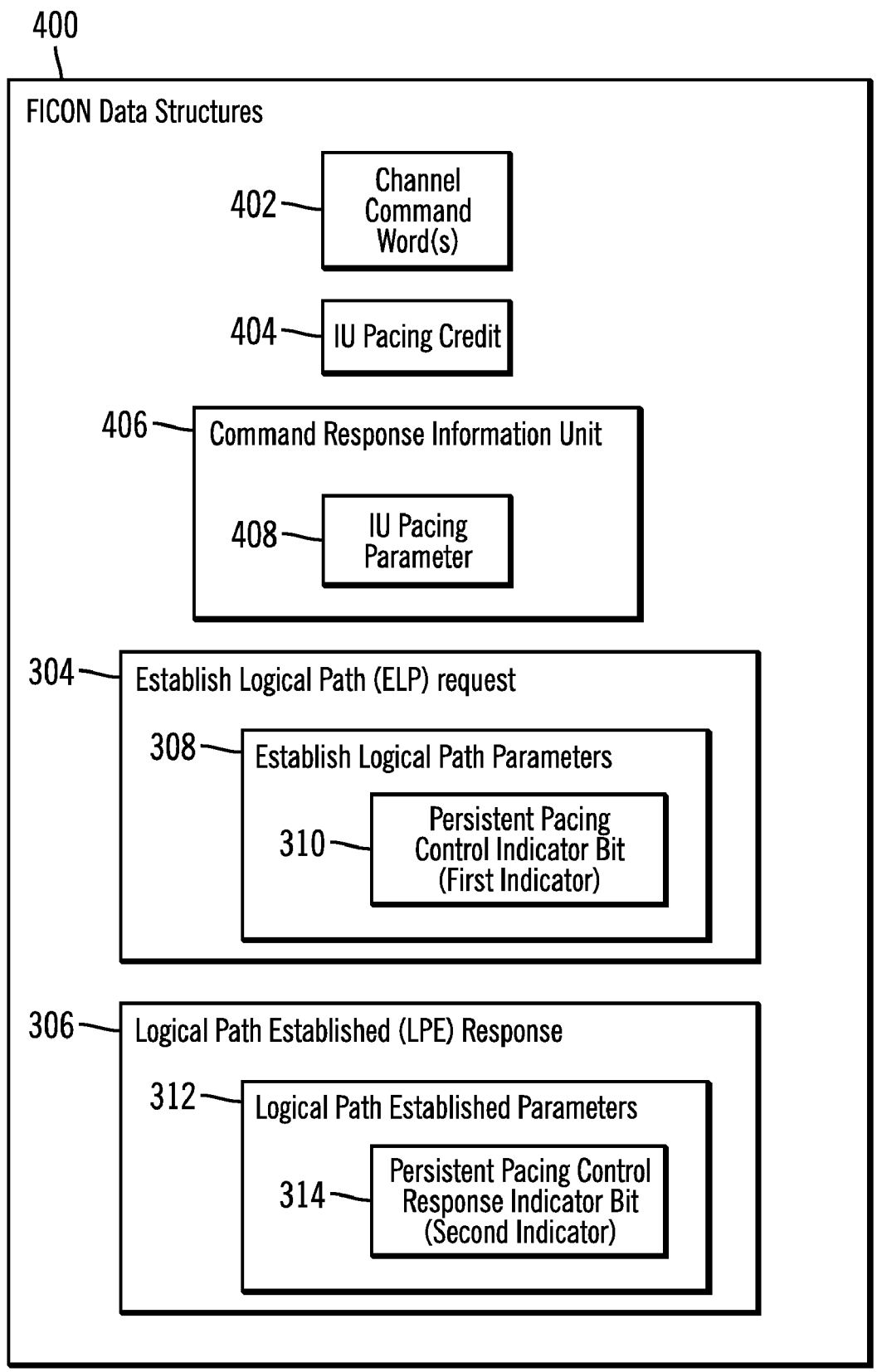
FIG. 4 illustrates data structures associated with a fibre channel connection, in accordance with certain embodiments.

FIG. 4 illustrates data structures associated with a fibre connection implemented over the fibre channel 108 in the computing environment 100, in accordance with certain embodiments. The data structures shown in FIG. 4 are referred to as FICON data structures 400.

The FICON data structures 400 include one or more channel command words 402, an information unit pacing credit 404, a command response information unit 406 having an information unit pacing parameter 408, where the information unit pacing parameter 408 is also referred to as an IU pacing parameter and the information unit pacing credit 404 may be referred to as a IU pacing credit. The FICON data structures 400 also include an establish logical path request 304 and a logical path established response 306.

The channel command words 402 are control blocks that include I/O requests. For example, in certain embodiments a channel command word 402 may include a read request from the host application 110 to the controller application 112, where the read request is a request for reading data stored by storage controller 104. The channel command words 402 may be sent from the channel 300 to the control unit 302. A channel command word 402 may also be referred to as an information unit.

Each channel 300 for fibre channel communications between the remote host 102 and the storage controller 104 provides the IU pacing credit 404 which may be initialized at either the start of each channel program or during a reconnection to continue the execution of a channel program. The IU pacing credit 404 is the maximum number of information units that the remote host 102 may send to the storage controller 104, before the remote host 102 receives the command response information unit 406 from the storage controller 104.

A command response information unit 406 is an information unit sent from the storage controller 104 to the remote host 102, in response to certain conditions. For example, a command response information unit 406 may be sent from the storage controller 104 to the remote host 102 in response to certain channel command words 402. The IU pacing parameter 408 associated with a command response information unit 406 may be sent from the port 120 of the storage controller 104 to indicate the maximum number of information units the remote host 102 may send over a channel. An IU pacing parameter 408 of zero indicates that the value of the IU pacing credit is to be reset to the default value.

At the start of a channel program or at each reconnection, the channel 300 may send a number of information units to the control unit 302. The number of information units sent may not exceed the value of the information unit pacing credit 404, where the value of the information unit pacing credit 404 is also referred to as information unit pacing credit value.

The establish logical path request 304 may be sent from the channel 300 to the control unit 302 to indicate the optional features supported by the channel 300 and to request the establishment of a logical path between the channel 300 and the control unit 302. The logical path established response 306 from the control unit 302 confirms the successful completion of an establish logical path function request and the establishment of the logical path, and indicates the optional features to be used on all information units sent between the channel 300 and the control unit 302.

The establish logical path request 304 may be implemented via an establish logical path function with associated parameters referred to as establish logical path parameters 308. A persistent pacing control indicator bit 310 included in the establish logical path parameters 308 may indicate whether or not the channel 300 provides support for persistent pacing, i.e., the retention of the value of the information unit pacing parameter 408 across a plurality of command chains, where a command chain is a sequence of channel command words. Persistent pacing may also be referred to as persistent information unit pacing.

The logical path established response 306 may be implemented via a function with associated parameters referred to as logical path established parameters 312. A persistent pacing control response indicator bit 314 included in the logical path established parameters 312 may indicate whether or not the control unit 302 provides support for persistent pacing.

Therefore, FIG. 4 illustrates certain embodiments in which a first indicator referred to as a persistent pacing control indicator bit 310 and a second indicator referred to as a persistent pacing control response indicator bit 314 indicate whether or not a logical path established between the channel 300 and the control unit 302 enables persistent pacing. In certain embodiments, the first indicator 310 and the second indicator 314 are included as an enhancement to a fibre channel protocol, wherein the enhancement to the fibre channel protocol supports persistent information unit pacing across the plurality of command chains.

Figure 5:
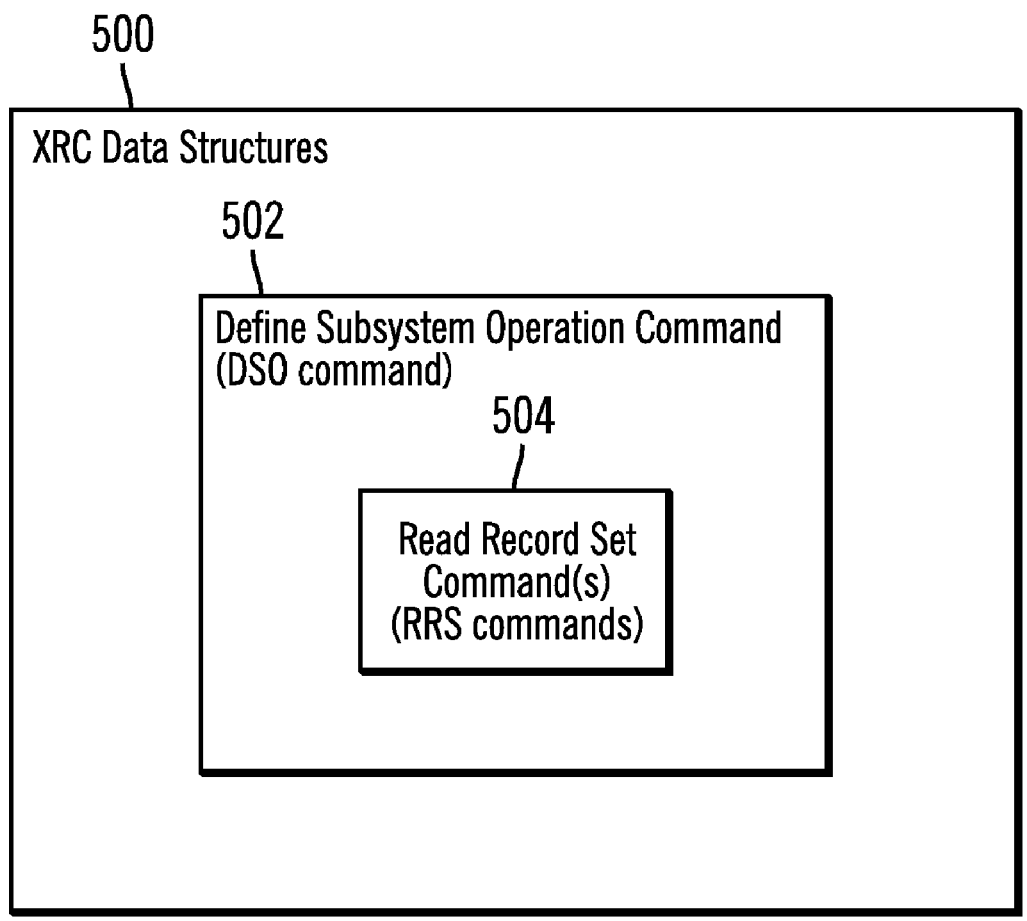
FIG. 5 illustrates data structures associated with extended remote copy, in accordance with certain embodiments.

FIG. 5 illustrates data structures associated with extended remote copy implemented in the computing environment 100, in accordance with certain embodiments. The data structures shown in FIG. 5 are referred to as XRC data structures 200.

The XRC data structures 500 may include a define subsystem operation (DSO) command 502 that defines a subsystem operation signaling the intent to execute a number of Read Record Set (RRS) channel command words in the current command chain. During extended remote copy operations, the DSO command 502 may define a subsystem operation during communications between the remote host 102 and the primary storage control unit 104. The RRS command 504, if associated with the DSO command 502, indicates to the primary storage control unit 104 that the remote host 102 is sending a read request.

Extended distance XRC configurations may use fiber channel extension technologies between the remote host 102 and the primary storage control unit 104. Extended fibre channel may be used by the remote host 102 to read data from the primary storage control unit 104 and store the data on storage at the remote storage control unit 106. In certain embodiments the data read from the primary storage control unit 104 is stored as backup data in the remote storage control unit 106.

In certain embodiments, the remote host 102 issues command chains to the primary storage control unit 104, where the command chain includes a DSO command 502 followed by a series of read record set commands 504, and finally additional commands [e.g., Perform Subsystem Function (PSF) commands and Read SubSystem Data (RSSD) commands as defined in XRC] to determine the number of sidefile entries for the next chain. The count of RRS commands 504 in the chain is indicated in the DSO command parameters, and in certain exemplary embodiments the count of RRS commands 504 may exceed 150 channel command words.

Therefore, FIG. 5 illustrates certain embodiments in which a read record set command 504 associated with a DSO command 502 indicates to the primary storage control unit 104 that read operations are requested by the remote host 102. Such DSO commands 502 may be sent from the remote host 102 to the primary storage control unit 104 in embodiments that implement extended remote copy.

Figure 6:
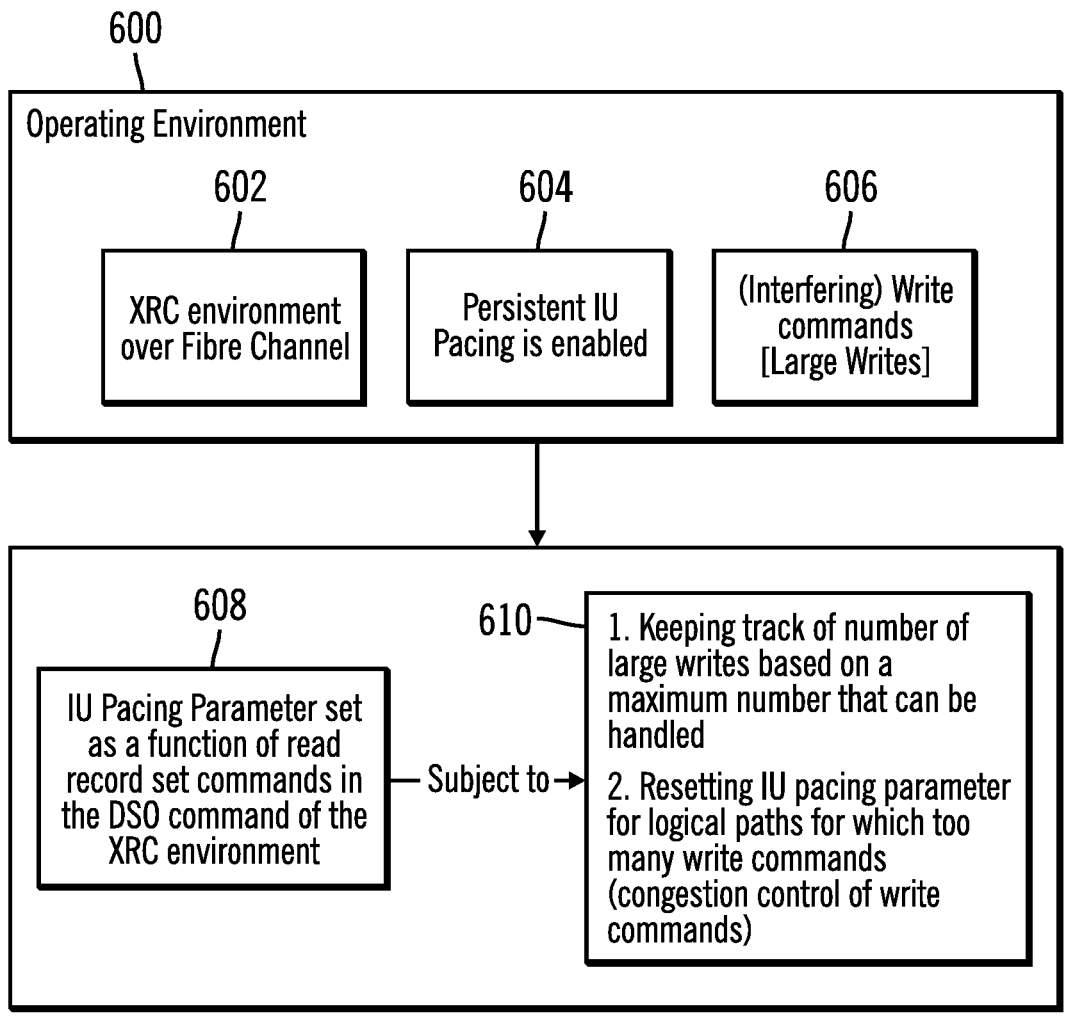
FIG. 6 illustrates a block diagram that shows how IU pacing parameter is set in an operating environment, in accordance with certain embodiments.

FIG. 6 illustrates a block diagram that shows how IU pacing parameter 408 is set in an operating environment 600, in accordance with certain embodiments. The operating environment 600 may occur in the computing environment 100.

Within the operating environment, an XRC environment over fibre channel (reference numeral 602) is operational between the remote host 102 and the primary storage control unit 104. Persistent information unit pacing (reference numeral 604) is enabled. However, in addition to DSO commands 502 with read record set commands 504, interfering write commands 606 are also sent from the remote host 102 to the primary storage control unit 104. The interfering write commands 606 may be large writes, wherein a large unit is defined as an I/O operation for which a number of data information units that are processed exceed the default IU pacing credit.

In the operating environment 600, the IU pacing parameter 408 is set as a function of read record set commands 504 in the DSO command of the XRC environment (reference numeral 608). Therefore, when persistent IU pacing is enabled more than 16 information units can be in flight at the same time. However, large write commands 606 may cause interference and problems. Therefore, within the operating environment 600 the number of large writes are tracked based on a maximum number of large writes that can be handled and the IU pacing parameter is reset for logical paths for which there are too many large writes (reference numeral 610). It can be viewed as a form of congestion control for write commands, such that, by resetting the IU pacing parameter the number of interfering write commands are limited during flow control.

Figure 7:
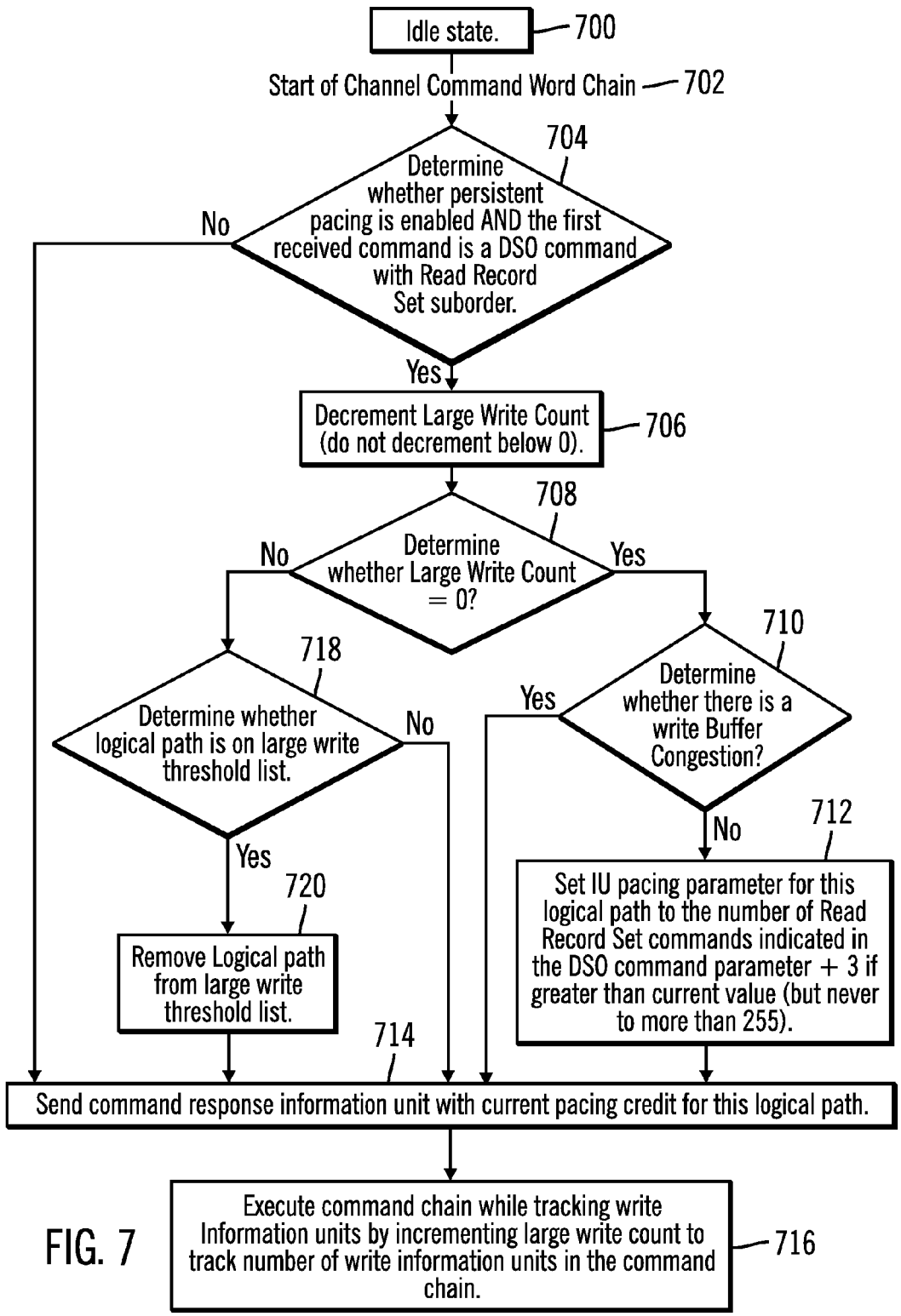
FIG. 7 illustrates a flowchart that shows first operations for setting IU pacing parameter, in accordance with certain embodiments.

FIG. 7 illustrates a flowchart that shows first operations for setting IU pacing parameter, in accordance with certain embodiments. The first operations may be implemented in the remote host 102 and the primary storage control unit 104 of the computing environment 100 via the controller application 112 and the host application 110.

Control starts at block 700 where the channel formed between the remote host 102 and the primary storage control unit 104 over the fibre channel 108 is in idle state, and a channel command word chain starts (reference numeral 702).

A determination is made (at block 704) as to whether persistent IU pacing is enabled and the first received command is a DSO command with Read Record Set suborder. If so a large write count is decremented (at block 706) but not allowed to fall below zero. A determination is made (at block 708) as to whether the large write count is 0 and if so, a determination is made (at block 710) if there is a congestion of buffers caused by the large writes. If not, then at block 712, the IU pacing parameter for the corresponding logical path is set to three more than the number of Read Record Set commands indicated in the DSO command parameter. However, the IU pacing parameter is never set to more than 255.

If at block 708 a determination is made that the large write count is not 0, then control proceeds to block 718 where a determination is made as to whether the corresponding logical path is on a large write threshold list. If so, then the logical path is removed (at block 720) from the large write threshold list.

As shown in FIG. 7, control can proceed to block 714 from any of the blocks 704, 720, 718, 710, and 712 as per indications provided in FIG. 7. At block 714, the command response information unit is sent with current IU pacing parameter for the logical path. Control proceeds to block 716, wherein the command chain is executed while tracking write information units by incrementing the write IU count to track the number of write information units in the command chain. It should be noted that at the end of an I/O operation, if write buffer congestion has occurred, then the pacing count is reset for all logical paths on the large write threshold list.

Figure 8:
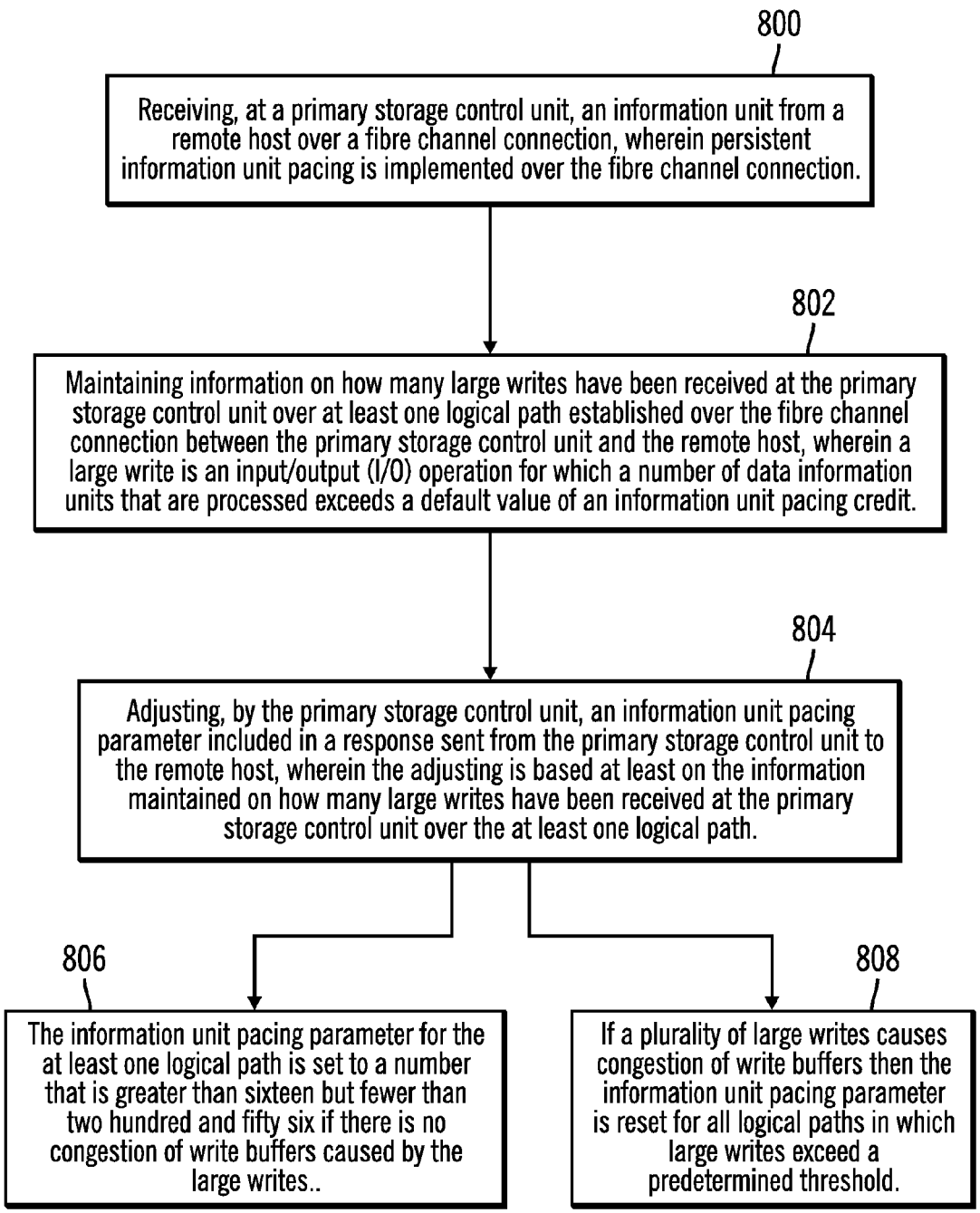
FIG. 8 illustrates a flowchart that shows second operations for setting IU pacing parameter.

FIG. 8 illustrates a flowchart that shows second operations for setting IU pacing parameter. The second operations may be implemented in the remote host 102 and the primary storage control unit 104 of the computing environment 100 via the controller application 112 and the host application 110.

Control starts at block 800, where the primary storage control unit 104 receives an information unit from a remote host 102 over a fibre channel connection 108, wherein persistent information unit pacing is implemented over the fibre channel connection 108.

Control proceeds to block 802, where information is maintained on how many large writes have been received at the primary storage control unit 104 over at least one logical path established over the fibre channel connection 108 between the primary storage control unit 104 and the remote host 102, wherein a large write is an input/output (I/O) operation for which a number of data information units that are processed exceeds a default value of an information unit pacing credit At block 804, the primary storage control unit 104 adjusts an information unit pacing parameter 408 included in a response sent from the primary storage control unit 104 to the remote host 102, wherein the adjusting is based at least on the information maintained on how many large writes have been received at the primary storage control unit 104 over the at least one logical path From block 804 control may proceed to block 806 and block 808. At block 806, the information unit pacing parameter for the at least one logical path is set to a number that is greater than sixteen but fewer than two hundred and fifty six if there is no congestion of write buffers caused by the large writes. At block 808, if a plurality of large writes causes congestion of write buffers then the information unit pacing parameter is reset for all logical paths in which large writes exceed a predetermined threshold.

Certain embodiments allow XRC implementations over Fibre Channel such that congestion control for large writes is performed while persistent IU pacing is enabled. It is preferable to not have applications that run large writes all the time on the same path as the XRC read operations as such large writes may interfere with the performance benefits of persistent pacing. The large write detection of certain embodiments is designed to allow for some periods of large write I/O when necessary.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 9:
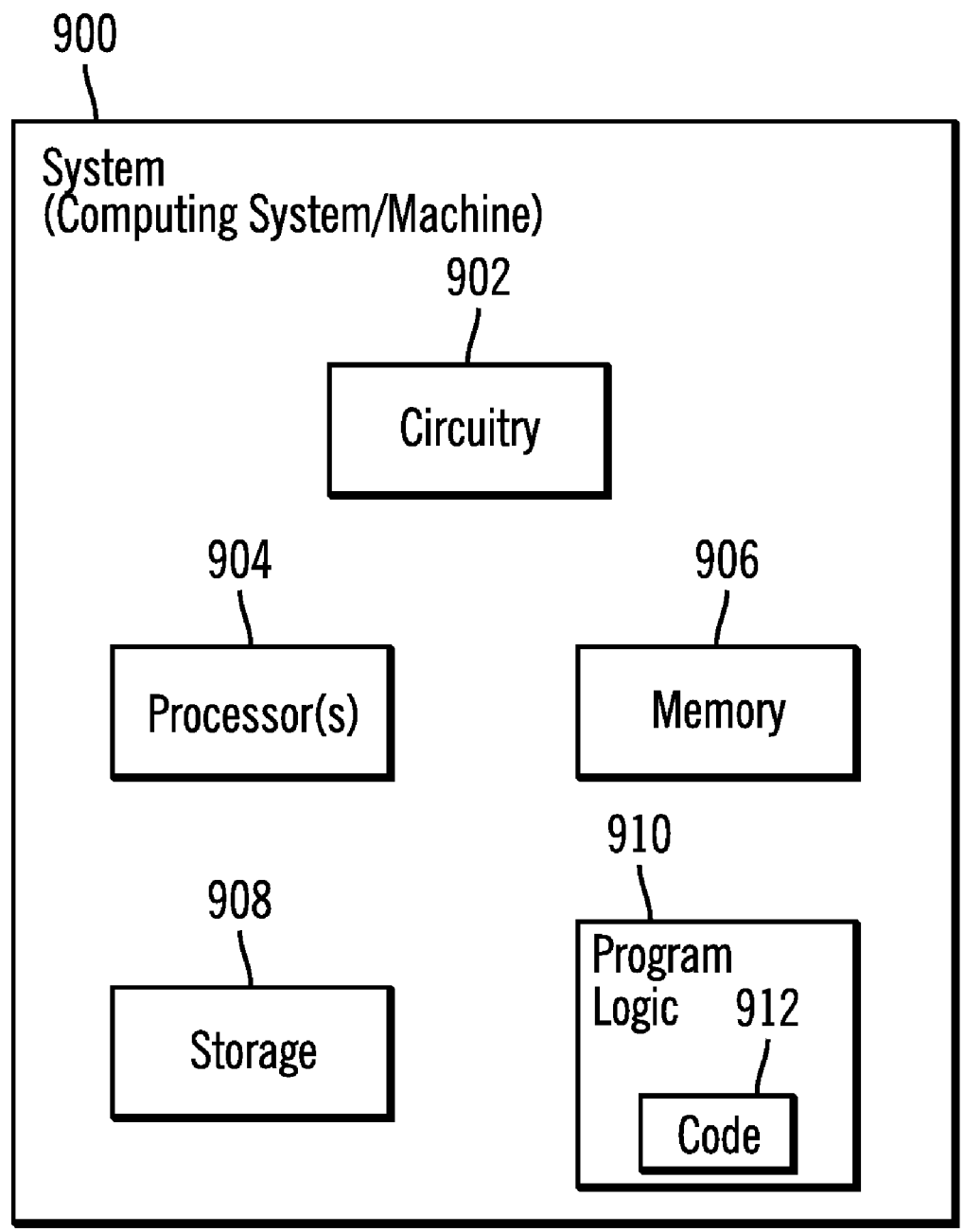
FIG. 9 illustrates the architecture of computing system, wherein in certain embodiments elements of the computing environment of FIG. 1 may be implemented in accordance with the architecture of the computing system.

FIG. 9 illustrates an exemplary computer system 900, wherein in certain embodiments the remote host 102, the primary storage controller 104, and the remote storage controller 106 of the computing environment 100 of FIG. 1 may be implemented in accordance with the computer architecture of the computer system 900. The computer system 900 may also be referred to as a system, and may include a circuitry 902 that may in certain embodiments include a processor 904. The system 900 may also include a memory 906 (e.g., a volatile memory device), and storage 908. Certain elements of the system 900 may or may not be found in the remote host 102, the primary storage controller 104, or the remote storage controller 106 of FIG. 1. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIG. 9 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-9 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

receiving, at a primary storage control unit, an information unit from a remote host over a fibre channel connection, wherein persistent information unit pacing is implemented over the fibre channel connection;

maintaining information on how many large writes have been received at the primary storage control unit over at least one logical path established over the fibre channel connection between the primary storage control unit and the remote host wherein a large write is an input/output (I/O) operation for which a number of information units that are processed exceeds a default value of an information unit pacing credit; and adjusting, by the primary storage control unit, an information unit pacing parameter included in a response sent from the primary storage control unit to the remote host, wherein the adjusting is based at least on the information maintained on how many of the large writes have been received at the primary storage control unit over the at least one logical path, wherein the information unit pacing parameter indicates the number of information units that the remote host is allowed to send to the primary storage control unit without waiting for any additional response from the primary storage control unit, the method further comprising:
  determining that there is no congestion of write buffers caused by the large writes; and
  selling the information unit pacing parameter for the at least one logical path to a number that is greater than sixteen but fewer than two hundred and fifty six.

2. The method of claim 1, wherein the information unit is a channel command word in a fibre connect protocol, and wherein the received channel command word starts a channel command word chain, the method further comprising:
  determining whether the channel command word comprises a define subsystem operation command that defines a subsystem operation for extended remote copy operations;
  determining the number of read record set commands associated with the define subsystem operation command, wherein a read record set command corresponds to a read request; and
  setting the information unit pacing parameter for a logical path such that an increased number of information units can be sent at a start of a next channel program, wherein if a same or a smaller number of the read record set commands are used, an entire channel command chain can be sent at once.

3. The method of claim 1, wherein if a plurality of the large writes causes congestion of write buffers then the information unit pacing parameter is reset for all logical paths in which the large writes exceed a predetermined threshold.

4. The method of claim 1, wherein the remote host performs extended remote copying of data from the primary storage control unit to a remote storage control unit, and wherein the remote host is geographically separated from the primary storage control unit by a distance of over a hundred kilometers.

5. A system, comprising:
  a memory; and
  a processor coupled to the memory, wherein the processor performs operations, the operations comprising:
    (i) receiving, at a primary storage control unit, an information unit from a remote host over a fibre channel connection, wherein persistent information unit pacing is implemented over the fibre channel connection;
    (ii) maintaining information on how many large writes have been received at the primary storage control unit over at least one logical path established over the fibre channel connection between the primary storage control unit and the remote host, wherein a large write is an input/output (I/O) operation for which a number of information units that are processed exceeds a default value of an information unit pacing credit; and
    (iii) adjusting, by the primary storage control unit, an information unit pacing parameter included in a response sent from the primary storage control unit to the remote host, wherein the adjusting is based at least on the information maintained on how many of the large writes have been received at the primary storage control unit over the at least one logical path, wherein the information unit pacing parameter indicates the number of information units that the remote host is allowed to send to the primary storage control unit without waiting for any additional response from the primary storage control unit, the operations further comprising:
      determining that there is no congestion of write buffers caused by the large writes; and
      selling the information unit pacing parameter for the at least one logical path to a number that is greater than sixteen but fewer than two hundred and fifty six.

6. The system of claim 5, wherein the information unit is a channel command word in a fibre connect protocol, and wherein the received channel command word starts a channel command word chain, the operations further comprising:
  determining whether the channel command word comprises a define subsystem operation command that defines a subsystem operation for extended remote copy operations;
  determining the number of read record set commands associated with the define subsystem operation command, wherein a read record set command corresponds to a read request; and
  setting the information unit pacing parameter for a logical path such that an increased number of information units can be sent at a start of a next channel program, wherein if a same or a smaller number of the read record set commands are used, an entire channel command chain can be sent at once.

7. The system of claim 5, wherein if a plurality of the large writes causes congestion of write buffers then the information unit pacing parameter is reset for all logical paths in which the large writes exceed a predetermined threshold.

8. The system of claim 5, wherein the remote host performs extended remote copying of data from the primary storage control unit to a remote storage control unit, and wherein the remote host is geographically separated from the primary storage control unit by a distance of over a hundred kilometers.

9. A computer readable storage medium, wherein code stored in the computer readable storage medium when executed by a processor causes operations, the operations comprising:
  receiving, at a primary storage control unit, an information unit from a remote host over a fibre channel connection, wherein persistent information unit pacing is implemented over the fibre channel connection;
  maintaining information on how many large writes have been received at the primary storage control unit over at least one logical path established over the fibre channel connection between the primary storage control unit and the remote host wherein a large write is an input/output (I/O) operation for which a number of information units that are processed exceeds a default value of an information unit pacing credit; and
  adjusting, by the primary storage control unit, an information unit pacing parameter included in a response sent from the primary storage control unit to the remote host, wherein the adjusting is based at least on the information maintained on how many of the large writes have been received at the primary storage control unit over the at least one logical path, wherein the information unit pacing parameter indicates the number of information units that the remote host is allowed to send to the primary storage control unit without waiting for any additional response from the primary storage control unit, the operations further comprising:
    determining that there is no congestion of write buffers caused by the large writes; and
    selling the information unit pacing parameter for the at least one logical path to a number that is greater than sixteen but fewer than two hundred and fifty six.

10. The computer readable storage medium of claim 9, wherein the information unit is a channel command word in a fibre connect protocol, and wherein the received channel command word starts a channel command word chain, the operations further comprising:
  determining whether the channel command word comprises a define subsystem operation command that defines a subsystem operation for extended remote copy operations;
  determining the number of read record set commands associated with the define subsystem operation command, wherein a read record set command corresponds to a read request; and
  setting the information unit pacing parameter for a logical path such that an increased number of information units can be sent at a start of a next channel program, wherein if a same or a smaller number of the read record set commands are used, an entire channel command chain can be sent at once.

11. The computer readable storage medium of claim 9, wherein if a plurality of the large writes causes congestion of write buffers then the information unit pacing parameter is reset for all logical paths in which the large writes exceed a predetermined threshold.

12. The computer readable storage medium of claim 9, wherein the remote host performs extended remote copying of data from the primary storage control unit to a remote storage control unit, and wherein the remote host is geographically separated from the primary storage control unit by a distance of over a hundred kilometers.

13. A method for deploying computing infrastructure, comprising integrating computer-readable code into a computing system, wherein the code in combination with the computing system performs:
  receiving, at a primary storage control unit, an information unit from a remote host over a fibre channel connection, wherein persistent information unit pacing is implemented over the fibre channel connection;
  maintaining information on how many large writes have been received at the primary storage control unit over at least one logical path established over the fibre channel connection between the primary storage control unit and the remote host, wherein a large write is an input/output (I/O) operation for which a number of information units that are processed exceeds a default value of an information unit pacing credit; and
  adjusting, by the primary storage control unit, an information unit pacing parameter included in a response sent from the primary storage control unit to the remote host, wherein the adjusting is based at least on the information maintained on how many of the large writes have been received at the primary storage control unit over the at least one logical path, wherein the information unit pacing parameter indicates the number of information units that the remote host is allowed to send to the primary storage control unit without waiting for any additional response from the primary storage control unit, wherein the code in combination with the computing system is further capable of performing:
    determining that there is no congestion of write buffers caused by the large writes; and
    selling the information unit pacing parameter for the at least one logical path to a number that is greater than sixteen but fewer than two hundred and fifty six.

14. The method for deploying computing infrastructure of claim 13, wherein the information unit is a channel command word in a fibre connect protocol, and wherein the received channel command word starts a channel command word chain, wherein the code in combination with the computing system performs:
  determining whether the channel command word comprises a define subsystem operation command that defines a subsystem operation for extended remote copy operations;
  determining the number of read record set commands associated with the define subsystem operation command, wherein a read record set command corresponds to a read request; and
  setting the information unit pacing parameter for a logical path such that an increased number of information units can be sent at a start of a next channel program, wherein if a same or a smaller number of the read record set commands are used, an entire chain channel command can be sent at once.

15. The method for deploying computing infrastructure of claim 13, wherein if a plurality of the large writes causes congestion of write buffers then the information unit pacing parameter is reset for all logical paths in which the large writes exceed a predetermined threshold.

16. The method for deploying computing infrastructure of claim 13, wherein the remote host performs extende d remote copying of data from the primary storage control unit to a remote storage control unit, and wherein the remote host is geographically separated from the primary storage control unit by a distance of over a hundred kilometers.

17. A system, comprising:
  a primary storage control unit;
  means for receiving, at the primary storage control unit, an information unit from a remote host over a fibre channel connection, wherein persistent information unit pacing is implemented over the fibre channel connection;
  means for maintaining information on how many large writes have been received at the primary storage control unit over at least one logical path established over the fibre channel connection between the primary storage control unit and the remote host wherein a large write is an input/output (I/O) operation for which a number of information units that are processed exceeds a default value of an information unit pacing credit; and
  means for adjusting, by the primary storage control unit, an information unit pacing parameter included in a response sent from the primary storage control unit to the remote host, wherein the adjusting is based at least on the information maintained on how many of the large writes have been received at the primary storage control unit over the at least one logical path, wherein the information unit pacing parameter indicates the number of information units that the remote host is allowed to send to the primary storage control unit without waiting for any additional response from the primary storage control unit;
  means for determining that there is no congestion of write buffers caused by the large writes; and
  means for setting the information unit pacing parameter for the at least one logical path to a number that is greater than sixteen but fewer than two hundred and fifty six.

18. The system of claim 17, wherein the information unit is a channel command word in a fibre connect protocol, and wherein the received channel command word starts a channel command word chain, the system further comprising:
  means for determining whether the channel command word comprises a define subsystem operation command that defines a subsystem operation for extended remote copy operations;

means for determining the number of read record set commands associated with the define subsystem operation command, wherein a read record set command corresponds to a read request; and means for setting the information unit pacing parameter for a logical path such that an increased number of information units can be sent at a start of a next channel program, wherein if a same or a smaller number of the read record set commands are used, an entire channel command chain can be sent at once.

19. The system of claim 17, wherein if a plurality of the large writes causes congestion of write buffers then the information unit pacing parameter is reset for all logical paths in which the large writes exceed a predetermined threshold.

20. The system of claim 17, wherein the remote host performs extended remote copying of data from the primary storage control unit to a remote storage control unit, and wherein the remote host is geographically separated from the primary storage control unit by a distance of over a hundred kilometers.

* * * * *